United States Patent
Hwang et al.

(10) Patent No.: US 9,232,415 B2
(45) Date of Patent: Jan. 5, 2016

(54) APPARATUS AND METHOD FOR ANALYZING PERFORMANCE ACCORDING TO INTER-CELL INTERFERENCE CONTROL BASED ON COORDINATED MULTIPOINT COMMUNICATION IN HETEROGENEOUS NETWORK

(71) Applicant: INDUSTRY FOUNDATION OF CHONNAM NATIONAL UNIVERSITY, Gwangju (KR)

(72) Inventors: Intae Hwang, Yongin-si (KR); Bora Kim, Mokpo-si (KR); Sangmi Moon, Gwangju (KR); Saransh Malik, Gwangju (KR); Chilwoo Lee, Gwangju-si (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 91 days.

(21) Appl. No.: 14/142,459

(22) Filed: Dec. 27, 2013

(65) Prior Publication Data
US 2015/0004994 A1    Jan. 1, 2015

(30) Foreign Application Priority Data
Jul. 1, 2013    (KR) .................. 10-2013-0076505

(51) Int. Cl.
*H04W 72/00*    (2009.01)
*H04W 24/02*    (2009.01)
*H04L 5/00*    (2006.01)

(52) U.S. Cl.
CPC ............. *H04W 24/02* (2013.01); *H04L 5/0032* (2013.01)

(58) Field of Classification Search
USPC ........................................ 455/452.1
See application file for complete search history.

(56) References Cited

U.S. PATENT DOCUMENTS

2011/0003611 A1*  1/2011  Haas et al. ............. 455/512
2014/0169490 A1*  6/2014  Medbo et al. .......... 375/267

FOREIGN PATENT DOCUMENTS

| JP | 2013510526 A | 3/2013 |
| KR | 1020110051096 A | 5/2011 |
| KR | 1020130032797 A | 4/2013 |

OTHER PUBLICATIONS

Korean Notice of Allowance for corresponding Korean Application No. 10-2013-0076505 dated May 19, 2015.

* cited by examiner

*Primary Examiner* — Joel Ajayi
(74) *Attorney, Agent, or Firm* — Hauptman Ham, LLP

(57) ABSTRACT

Provided is a method of analyzing performance according to inter-cell interference control based on coordinated multipoint (CoMP) communication in a heterogeneous network (HetNet) to check that performance is enhanced by applying a variety of scheduling and pre-coding based on the CoMP communication in a HetNet environment of a Long Term Evolution-Advanced system to analyze the performance. The method applies a variety of scheduling and pre-coding based on coordinated beamforming scheme of CoMP communication technology, where the scheduling includes coordinated scheduling technique and the precoding includes QR decomposition, Tomlinson-Harashima precoding, polar decomposition, and singular value decomposition techniques, and compares and analyzes performances when there are only macrocells or when there are picocells at the boundaries of the macrocells, thereby checking that the gain is enhanced.

13 Claims, 11 Drawing Sheets

FIG. 1 a:Macro only b:Macro and pico

APPARATUS AND METHOD FOR ANALYZING PERFORMANCE ACCORDING TO INTER-CELL INTERFERENCE CONTROL BASED ON COORDINATED MULTIPOINT COMMUNICATION IN HETEROGENEOUS NETWORK

CROSS-REFERENCE TO RELATED APPLICATION

This application claims priority to and benefit of patent application Ser. No. 10-2013-0076505, filed on Jul. 1, 2013 in Korea, which is hereby incorporated by reference herein in its entirety.

TECHNICAL HELD

The present disclosure relates to an apparatus and method for analyzing performance according to inter-cell interference control based on coordinated multipoint (CoMP) communication in a heterogeneous network (HetNet), and more particularly, to an apparatus and method for analyzing performance according to inter-cell interference (ICI) control based on CoMP communication in a HetNet in order to mitigate ICI by applying a variety of scheduling and pre-coding based on CoMP in a HetNet environment of a Long Term Evolution-Advanced (LTE-A) system.

BACKGROUND

Recently, along with the widespread proliferation of smartphones, users' desires to receive support of high-quality data services anywhere at any time are increasing tremendously. Thus, there is a need for a technology for providing a high data rate for the terminals at the boundaries of cells as well as at centers thereof.

Although it is possible to increase a data transfer rate by supporting an additional antenna port for each cell at the center of the cell, it is difficult to increase the data transfer rate over a limit at the boundary of the cell without inter-cell cooperation because the terminals at the boundary of the cell are significantly affected by interference from neighboring cells.

In addition, in order to enable a high-rate data service even at a region in which there are many users, frequency reuse technology using a small cell, such as a picocell or femtocell, in an area covered by a macrocell is being widely used, thereby further increasing a need for a technology for efficiently controlling interference between transmission points.

The technology for efficiently controlling interference between transmission points is a major issue in this field. In particular, the technology is called coordinated multipoint (CoMP) by the 3rd Generation Partnership Project (3GPP) and has been selected as a research item for Long Term Evolution-Advanced (LTE-A) Release 11.

Accordingly, there is a great need to develop technologies for mitigating the inter-cell interference, increasing transfer efficiency, and evaluating their performances through CoMP technology.

SUMMARY

The present invention provides an apparatus and method for analyzing performance according to inter-cell interference (ICI) control based on coordinated multipoint (CoMP) communication in a heterogeneous network (HetNet) in order to mitigate ICI by applying a variety of scheduling and pre-coding based on CoMP in a HetNet environment of a Long Term Evolution-Advanced (LTE-A) system.

The present invention also provides an apparatus and method for analyzing performance according to ICI control based on CoMP communication in a HetNet in order to obtain an enhanced gain by applying a variety of scheduling and pre-coding based on a coordinated beamforming (CB) scheme of CoMP communication technology, in which the scheduling includes a coordinated scheduling (CS) technique and the precoding includes OR, THP, PD, and SVD techniques.

In accordance with some embodiments, an apparatus for analyzing performance according to ICI control based on CoMP communication in a HetNet includes: a communication unit configured to communicate with a user equipment (UE) and another device within the HetNet; and a control unit configured to calculate a priority of a cell center user (CCU) having a highest priority for each of three sectors of one cluster, compare the calculated priority of the CCU with a priority of a cell edge user (CEU) having a highest priority in the cluster, and control scheduling such that the transmission to the CEU is performed using the CoMP transmission scheme if the priority of the CEU is higher than the priority of the CCU and transmission to the CCU is performed using a general transmission scheme if the priority of the CCU is higher than the priority of the CEU, wherein the control unit compares and analyzes performances caused by performing the scheduling when there are only macrocells and when there are picocells at the boundaries of the macrocells.

The control unit may perform the calculation, comparison, and scheduling operations on all clusters and all UEs of the clusters in the HetNet.

In accordance with some embodiments, an apparatus for analyzing performance according to ICI control based on CoMP communication in a HetNet includes: a communication unit configured to communicate with a UE and another device within the HetNet; and a control unit configured to perform precoding by multiplying a matrix predetermined according to one of QR decomposition (QRD), Tomlinson-Harashima precoding (THP), polar decomposition (PD) and singular value decomposition (SVD) techniques by a signal intended to be transmitted to an enhanced Node-B (eNB) transmission end of the HetNet, wherein the control unit compares and analyzes performances caused by performing the precoding when there are only macrocells or when there are picocells at the boundaries of the macrocells.

The QRD technique may decompose a channel matrix through QRD and thus generate a precoding matrix, and the channel matrix H and the precoding matrix W may be expressed as Formulae (8) below, $$H = RQ^H$$

$$W = QF \qquad (8),$$

where Q is a unitary or semi-unitary matrix and R is a lower triangular matrix,

The THP technique may be a non-linear preceding technique and a technique additionally using a modulo operation, the modulo operation being symmetrical to a point above a threshold value and performed using Formula (9) below, $$\mathrm{mod}_A(x) = x - A\left\lfloor \left(x - \frac{A}{2}\right)/A \right\rfloor. \qquad (9)$$

The SVD technique may be a technique for multiplying channels by an orthogonal matrix to separate the channels in parallel at the communication unit, and a channel matrix H and a precoding matrix W may be expressed as Formulae (10) below, $$H = U\Sigma V^H$$
$$W = V \quad (10),$$

where U is an m-unitary or semi-unitary matrix, $\Sigma$ is an m-rectangular diagonal matrix having a positive diagonal component, and V is an n-unitary matrix, The PD technique may separate channels based on the SVD technique, and a channel matrix H and a preceding matrix W may be expressed as Formulae (11) below, $$H = QSP^H = AU^H$$
$$A = QSQ^H$$
$$W = U = PQ^H \quad (11),$$

where A is a positive semi-definite Hermitian gain matrix, and U is a unitary or semi-unitary phase matrix.

In accordance with some embodiments, a method of analyzing performance according to ICI control based on CoMP communication in a HetNet includes: calculating a priority of a CCU having a highest priority for each of three sectors of one cluster in a HetNet of an LTE-A system, comparing the calculated priority of the CCU with a priority of a CEU having a highest priority in the cluster; determining which of the priority of the CCU and the priority of the CEU is higher; performing scheduling such that transmission to the CEU is performed using the CoMP transmission scheme if the priority of the CEU is higher than the priority of the CCU and transmission to the CEU is performed using a general transmission scheme if the priority of the CCU is higher than the priority of the CEU; and comparing and analyzing performances caused by performing the scheduling when there are only macrocells and when there are picocells at the boundaries of the macrocells.

The calculation, comparison, determination, and scheduling may be performed on all clusters and all user terminals in the clusters in the LTE-A network.

In accordance with some embodiments, a method of analyzing performance according to ICI control based on CoMP communication in a HetNet includes: performing precoding by multiplying a matrix predetermined according to one of QRD, THP, PD and SVD techniques by a signal intended to be transmitted at an eNB transmission end of the HetNet, and comparing and analyzing performances caused by performing the precoding when there are only macrocells or when there are picocells at the boundaries of the macrocells.

In accordance with some embodiments, a computer-readable recording medium stores a computer program for executing the method of analyzing performance according to ICI control based on CoMP communication in a HetNet.

DETAILED DESCRIPTION

Hereinafter, embodiments of the present invention will be described in detail with reference to the accompanying drawings. However, detailed descriptions related to well-known functions or configurations will be omitted in order to avoid unnecessarily obscuring subject matters of the present invention. Therefore, unnecessary redundant description is avoided for the purpose of obviously describing the subject matters of the present invention without unnecessary obscurity. In addition, it should be noted that like reference numerals denotes like elements throughout the specification and drawings.

Figure 1:
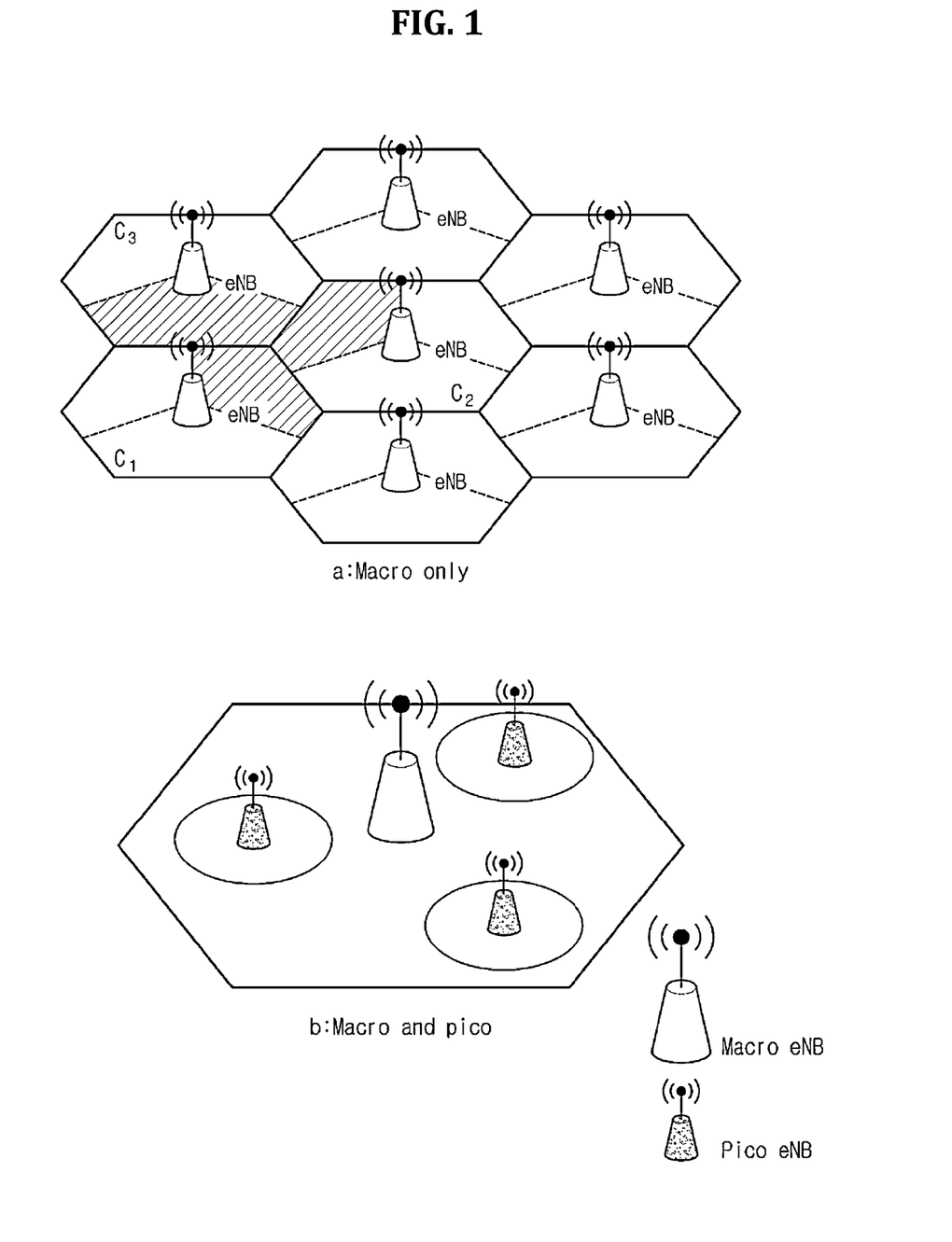
FIG. 1 is a view showing a structure of a heterogeneous network (HetNet) among Long Term Evolution-Advanced (LTE-A) networks according to an embodiment of the present invention.

FIG. 1 is a view showing a Long Term Evolution-Advanced (LTE-A) network according to an embodiment of the present invention.

Referring to FIG. 1, the LTE-A network is a heterogeneous network (HetNet), which is one of LTE-A networks, based on an LTE-A Release 11 scenario.

As shown in a portion (a) of FIG. 1, one macrocell is divided into three sectors, and adjacent sectors constitute one cell site and perform cooperative communication.

In addition, as shown in a portion (b) of FIG. 1, one macrocell includes several picocells, which perform communication in cooperation with the macrocell. In this case, user equipments (UEs) are randomly and uniformly distributed in the picocells and the macrocell.

In a general cellular system, the UEs receive signals from enhanced Node-Bs (eNBs) and also receive interference signals from neighboring eNBs. If there are three sectors in one cell site, and $H_{i1}$ denotes a channel between an ith cell $C_i$ and a first user $M_1$, a signal $Y_1$, which is received by a user located in $C_1$, is expressed as Formula (1) below, $$Y_1 = H_{11}W_1X_1 + H_{21}W_2X_2 + H_{31}W_3X_3 + Z_1 \quad (1),$$

where $W_i$ is a precoding matrix in an ith cell and $X_i$ is a signal transmitted from the ith cell to a UE in the ith cell. $Z_1$ is white noise caused by a user antenna located in $C_1$.

As shown in Formula (1), inter-cell interference (ICI) is caused as signals coming from neighboring eNBs act as interference, thus limiting channel capacity.

A signal-to-interference-plus-noise ratio (SINR) of a user located in C1 is expressed as Formula (2) below, $$SINR = \frac{\|H_{11}W_1\|^2 P_1}{\|H_{21}W_2\|^2 P_2 + \|H_{31}W_3\|^2 P_3 + N}. \quad (2)$$

In order to overcome limitations with respect to the ICI and the limited channel capacity, the present invention intends to propose a method for controlling ICI based on coordinated multipoint (CoMP) communication technology.

First, in order to control the ICI based on the CoMP communication technology, all cells that participate in cooperation operate as one cell, and only antennas are disposed in distribution. Accordingly, one device processes all data and channel information.

Thus, an eNB of a user also may be increased in capacity in consideration of signals coming from neighboring eNBs, thereby maximizing wireless resource efficiency and more particularly increasing a transfer rate of a user located at the boundary of the cell.

The CoMP technique may be largely classified as a joint processing (JP) scheme or a coordinated scheduling and/or coordinated beamforming (CS/CB) scheme.

First, the CoMP JP scheme will be described.

For the CoMP JP scheme, an SINK of a user located in C1 is expressed as Formula (3) below, $$SINR = \frac{\|H_{11}W_1\sqrt{P_1} + H_{21}W_2\sqrt{P_2} + H_{31}W_3\sqrt{P_3}\|^2}{N}. \quad (3)$$

As shown in Formula (3), it can be seen that a signal coming from another cell may be used as a useful signal rather than an interference signal through cooperation with neighboring eNBs and only noise acts as an element that disturbs the signal.

Next, the CoMP CB scheme will be described.

For the CoMP CB scheme, signals received by users located in each cell are expressed as Formulae (4) below, $$Y_1 = H_{11}W_1X_1 + H_{21}W_2X_2 + H_{31}W_3X_2 + Z_1$$

$$Y_2 = H_{12}W_1X_1 + H_{22}W_2X_2 + H_{32}W_2X_2 + Z_2$$

$$Y_3 = H_{13}W_1X_1 + H_{23}W_2X_2 + H_{33}W_3X_3 + Z_3 \quad (4).$$

Using Formulae (4), it is possible to measure each SINR and apply a preceding matrix having a highest SINR to each cell, thereby minimizing interference coming from adjacent cells and maximizing reception signal strength.

Preceding for this is expressed as Formulae (5) below, $$W_1' = \mathrm{argmax}_{W_1} \frac{\|H_{11}W_1\|^2 P_1}{\|H_{21}W_2\|^2 P_2 + \|H_{31}W_1\|^2 P_3 + N}$$

$$W_2' = \mathrm{argmax}_{W_2} \frac{\|H_{22}W_2\|^2 P_2}{\|H_{12}W_1\|^2 P_1 + \|H_{32}W_3\|^2 P_3 + N}$$

$$W_3' = \mathrm{argmax}_{W_3} \frac{\|H_{33}W_3\|^2 P_3}{\|H_{13}W_1\|^2 P_1 + \|H_{23}W_2\|^2 P_2 + N}. \quad (5)$$

In the present invention, performance evaluation is performed using the CoMP CB scheme, which has good performance versus complexity/feedback overhead tradeoff.

Hereinafter, solutions that can increase a transfer rate by applying a variety of scheduling and precoding in order to enhance CoMP communication performance according to the present invention will be described.

First, the scheduling, which is one of the solutions for enhancing the CoMP communication performance, will be described. A flexible frequency allocation plan (FFAP) technique and a CS technique are applied to embodiments of the present invention.

Figure 2:
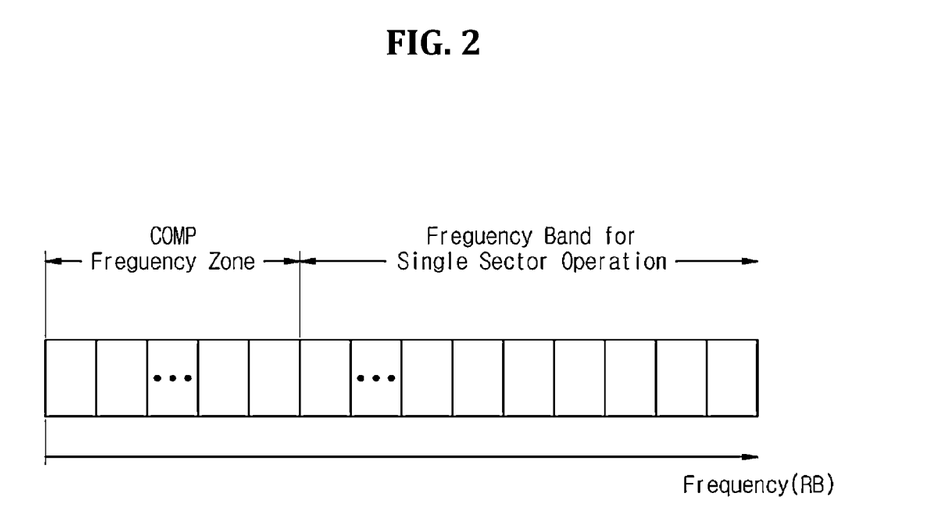
FIG. 2 is a view showing a structure of a coordinated multipoint (CoMP) flexible frequency allocation plan (FFAP) technique according to an embodiment of the present invention.

First, the FFAP technique is a method for allocating a specific frequency band to a UE using CoMP technology, and a structure of the technique may be shown such as in FIG. 2.

Referring to FIG. 2, an entire frequency band includes a CoMP frequency zone and a frequency band for single sector operation.

First, a UE located at the center of the cell (cell center user; hereinafter referred to as CCU) and a UE located at the boundary of the cell (cell edge user; hereinafter referred to as CEU) are divided on the basis of received SINRs, and if the SINRs are equal to or less than γ as shown in Formula (6), the UE is determined as a CEU, $$SINR \leq \gamma \quad (6),$$

where γ is a predetermined threshold. According to a ratio of CEUs to all UEs, a portion of the entire frequency band is allocated to CEUs.

In this case, a ratio in the CoMP frequency zone is expressed as Formula (7) below, $$\beta = \frac{N_{CEU}}{N_{CCU} + N_{CEU}} \times \alpha, \quad (7)$$

where $N_{CEU}$ and $N_{CCU}$ denote the number of CEUs and the number of CCUs. α is a frequency ratio value allocated to CCUs. For example, the optimum value of 0.8 may be used in a performance evaluation test.

Figure 3:
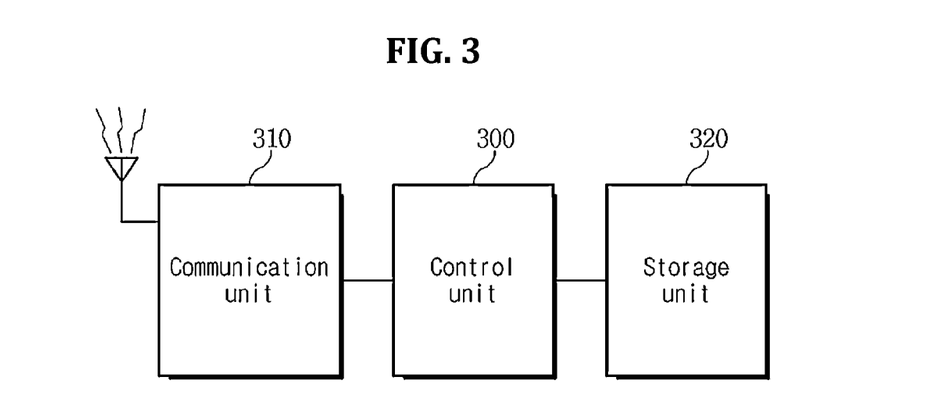
FIG. 3 is a view showing an internal structure of an enhanced Node-B (eNB) of a HetNet of an LTE-A system according to an embodiment of the present invention.

FIG. 3 is a view showing an internal structure of an eNB of a HetNet of an LTE-A system according to an embodiment of the present invention. Here, the eNB is an ICI control device based on CoMP communication in a HetNet of an LTE-A system according to the present invention, and includes a control unit 300, a communication unit 310, and a storage unit 320.

First, the communication unit 310 performs communication with a UE and other devices that reside in the HetNet of the LTE-A system.

The storage unit 320 stores data necessary for the ICI control.

The control unit 300 calculates a priority of a CCU having a highest priority for each of three sectors of one cluster, compares the calculated priority of the CCU with a priority of a CEU having a highest priority in the cluster, and controls scheduling such that transmission to the CEU may be performed using the CoMP transmission scheme if the priority of the CEU is higher than the priority of the CCU and transmission to the CEU may be performed using a general transmission scheme if the priority of the CCU is higher than the priority of the CEU. The control unit 300 may perform the calculation operation, the comparison operation, and the scheduling operation on all clusters and all user terminals of the clusters in the LTE-A network. In addition, the performance may be enhanced by performing scheduling based on CoMP through the performance analysis after the scheduling of the control unit 300. Details of the performance analysis will be described with reference to FIGS. 5 to 8.

In addition, the control unit 300 may perform precoding by multiplying a matrix, which is previously set according to one of QR decomposition (QRD), Tomlinson-Harashima precoding (THP), polar decomposition (PD) and singular value decomposition (SVD) techniques, by a signal intended to be transmitted at an eNB transmission end of the LTE-A network and then perform precoding based CoMP through the performance analysis, thereby enhancing the performance. Details of the performance analysis will be described with reference to FIGS. 9 to 12. In addition, QRD, THP, PD and SVD techniques will be described below.

Next, the CS technique is a scheme for giving a CCU and a CEU that reside in each cluster an opportunity to transmit data for each resource block (RB). The scheduling process according to this technique may be shown such as in FIG. 4.

Figure 4:
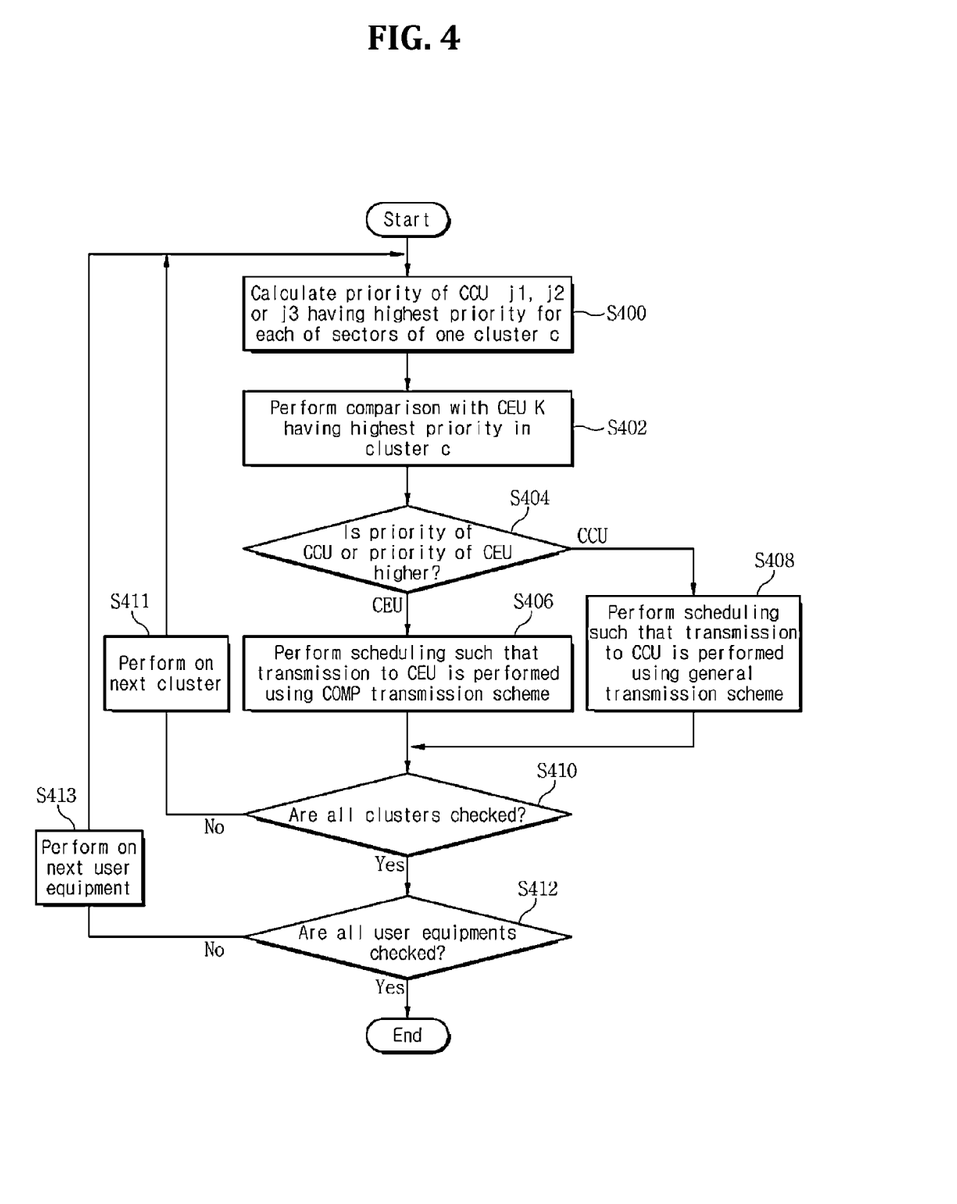
FIG. 4 is a flow chart showing a scheduling process using a CoMP coordinated scheduling (CS) technique according to an embodiment of the present invention.

FIG. 4 is a flow chart showing a scheduling process using a CoMP CS technique according to an embodiment of the present invention.

Referring to FIG. 4, the eNB calculates priorities $prior_{j1}$, $prior_{j2}$, and $prior_{j3}$ of CCUs $j_1$, $j_2$, and $j_3$, each of which has a highest priority for each of three sectors of one cluster c in operation S400.

Subsequently, the eNB compares the calculated priority with a priority $prior_k$ of a CEU k having the highest priority in the cluster c in operation S402.

The eNB determines which of the priority of the CEU and the priority of the CCU is higher in operation S404, and if the priority of the CEU is higher than the priority of the CCU, performs scheduling such that transmission to the CEU may be performed using the CoMP transmission scheme in operation S406.

If the priority of the CCU is higher than the priority of the CEU, the eNB performs scheduling such that transmission to the CCU may be performed using a general transmission scheme in operation S408.

Operations S400 to S408 are performed on all clusters and all UEs of the clusters in operations S410, S411, S412, and S413.

That is, as described above, the CoMP CS technique is a scheme for giving a CCU and a CEU that reside in each cluster an opportunity to transmit data for each RB. The scheduling process is performed by comparing the priority of the CCU and the priority of the CEU, such as in FIG. 4.

In addition, the performance may be enhanced by performing scheduling based on CoMP through the performance analysis after the scheduling as described above.

Next, the precoding, which is another one of the solutions for enhancing the CoMP communication performance, will be described.

The precoding is a method for increasing an SINR and spectrum efficiency by multiplying a specific matrix by a signal at a transmission end. The present invention uses QRD, THP, PD and SVD techniques.

First, the QRD technique analyzes a channel matrix through QR analysis and thus generates a precoding matrix. The channel matrix H and a precoding matrix W are basically expressed as Formulae (8) below, $$H = RQ^H$$

$$W = QF \quad (8),$$

where Q is a unitary or semi-unitary matrix, and R is a lower triangular matrix.

Second, the THP technique is a non-linear precoding technique, which is based on an information theory of a Costaon dirty paper result. That is, if the transmission end is aware of an interference signal, the same channel capacity may be obtained as the channel capacity without interference. THP precoding is a technique in which a modulo operation is additionally performed on the basis of Costa precoding and the modulo operation is a non-linear operation which is symmetrical to a point above a threshold value.

The modulo operation is expressed as Formula (9) below, $$\mathrm{mod}_A(x) = x - A \left\lfloor \left( x - \frac{A}{2} \right) \Big/ A \right\rfloor. \quad (9)$$

Third, the SVD technique is a method for multiplying an orthogonal matrix by channels to separate the channels in parallel. A channel matrix H and a precoding matrix W are basically expressed as Formulae (10) below, $$H = U\Sigma V^H$$

$$W = V \quad (10),$$

where U is an m-unitary or semi-unitary matrix, $\Sigma$ is an m-rectangular diagonal matrix having a positive diagonal component, and V is an n-unitary matrix.

Last, the PD technique separates channels based on the SVD technique, and the channel matrix H and precoding matrix W are expressed as Formulae (11) below, $$H = QSP^H = AU^H$$

$$A = QSQ^H$$

$$W = U = PQ^H \quad (11),$$

where A is a positive semi-definite Hermitian matrix as a gain matrix, and U is a unitary or semi-unitary matrix as a phase matrix.

As described above, performance variation obtained according to a CoMP technique to a homogeneous network of the LIE-A system and performance gain obtained by applying a basic technique and additional scheduling and precoding techniques of CoMP will be described using cumulative distribution function (CDF) graphs of FIGS. 5 to 8.

In this case, a simulation test environment conforms to 3GPP LTE-A standard and produces a system level simulation using Matlab on the basis of Table (1) below. In addition, the system structure is produced according to simulation parameters and classified according to an eNB and its position. Then, measurement of an SINR and spectrum efficiency is performed through data transmission and channel,

| Parameter | Value |
| --- | --- |
| Carrier frequency | 2 GHz |
| Bandwidth | 20 MHz |
| Cellular structure | Hexagonal grid, 2-tiers, 7 cell sites, 3 sectors per site, 3 picocells per site |
| No. of MSs per cell | 100 MSs |
| Antenna configuration | BS: 2, MS: 2 |
| BS max TX power | Macrocell: 49 dBm |
| | Picocell: 30 dBm |
| Cell radius (R) = ISD/ROOT3 | [Case 3] 1732/ROOT3 = ~1000 m |
| Path loss model | Macrocell: L = 128.1 + 37.6 log10(R), R in km |
| | Picocell: L = 140.7 + 37.6 log10(R), R in km |
| Shadow std. deviation | 8 dB |
| MS noise level | 174 dBm/Hz |
| UE noise figure | 9 dB |
| NodeB noise figure | 5 dB |
| Correlation distance of shadowing | 50 m |
| Shadowing correlation between cells/sectors | 0.5/1.0 |

-continued

| Parameter | Value |
| --- | --- |
| Minimum distance | Macro-UE: >35 m, Pico-UE: >10 m, Macro-pico: >75 m, Pico-pico: >40 m |
| BS antenna gain plus cable loss | 14 dBi for micro, macro cell case |
| Antenna pattern | 70 degree sectored beam = 70 degrees, Am = 20 dB |
| Scheduling scheme | FFAP, CS |
| Precoding scheme | SVD, PD, THP, QRD |

Table (1) represents simulation parameters based on a 3GPP LTE-A 20 MHz bandwidth. In this case, it is assumed that a simulation result is based on a link-level Monte Carlo simulation.

Figure 5:
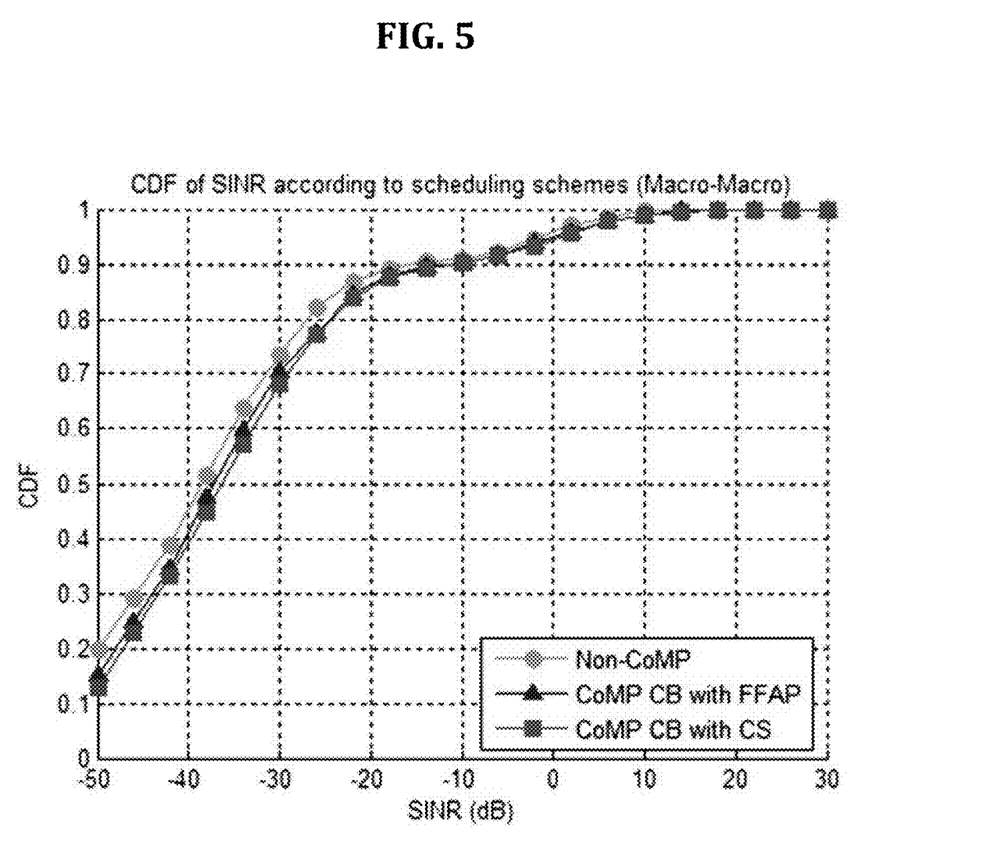
FIGS. 5 and 6 are exemplary views showing graphs of cumulative distribution functions (CDFs) with respect to a signal-to-interference-plus-noise ratio (SINR) when scheduling is applied to a CoMP coordinated beamforming (CB) technique according to an embodiment of the present invention.
Figure 6:
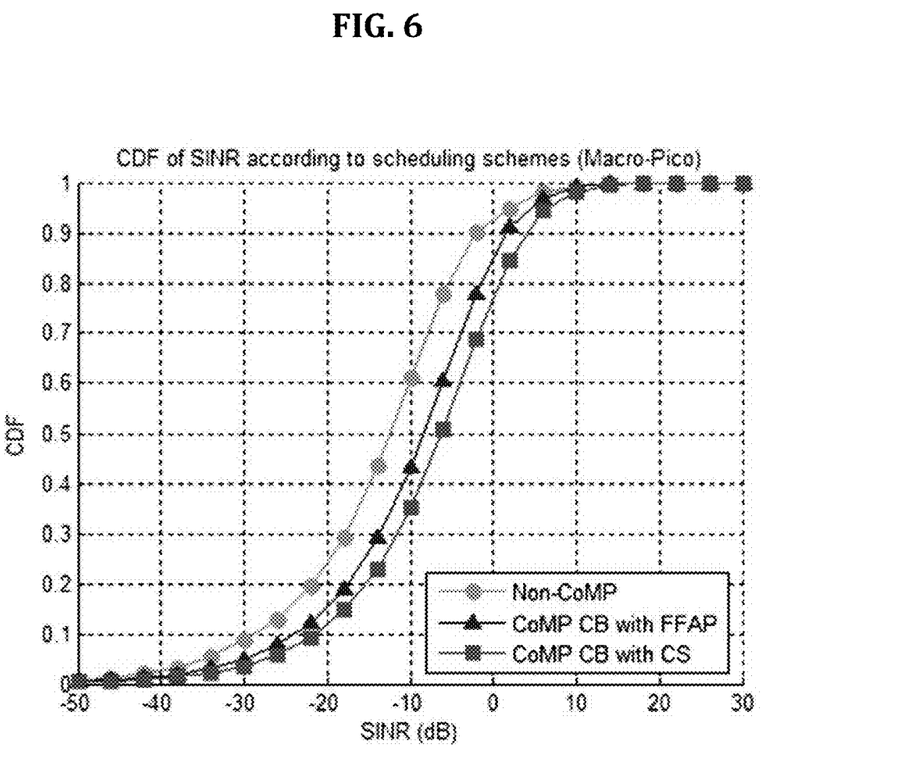

Graphs of CDFs with respect to an SINR when scheduling is applied to a CoMP CB technique under the above-described conditions are shown in FIGS. 5 and 6.

FIG. 5 shows an SINR for a UE in a macrocell when cooperation is performed between macrocells, and FIG. 6 shows an SINR for a UE in a picocell when cooperation is performed between a macrocell and a picocell.

It can be seen from the two results that CDF graphic performance may be further enhanced when the scheduling is applied to the CoMP scheme, compared to when the CoMP scheme is not used, and the performance of the system is most enhanced when CoMP CB and CS techniques are used.

A UE in a picocell is located in a boundary of a macrocell and thus less affected by interference from the macrocell, thereby improving the entire performance.

Figure 7:
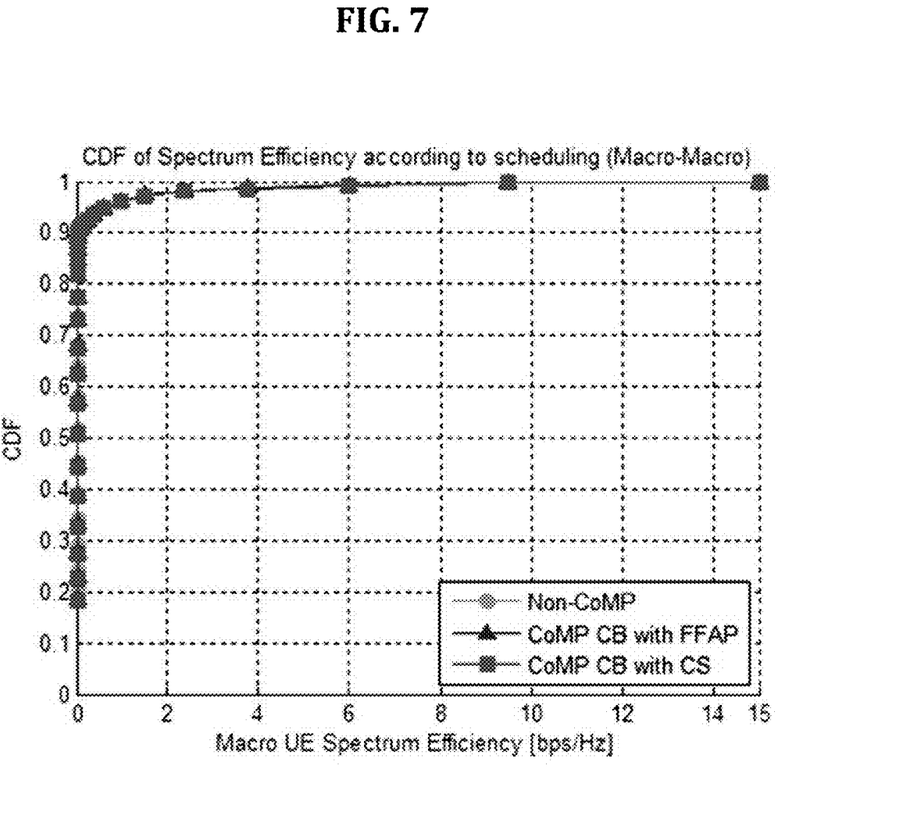
FIGS. 7 and 8 are exemplary views showing graphs of CDFs with respect to spectrum efficiency when scheduling is applied to a CoMP CB technique according to an embodiment of the present invention.
Figure 8:
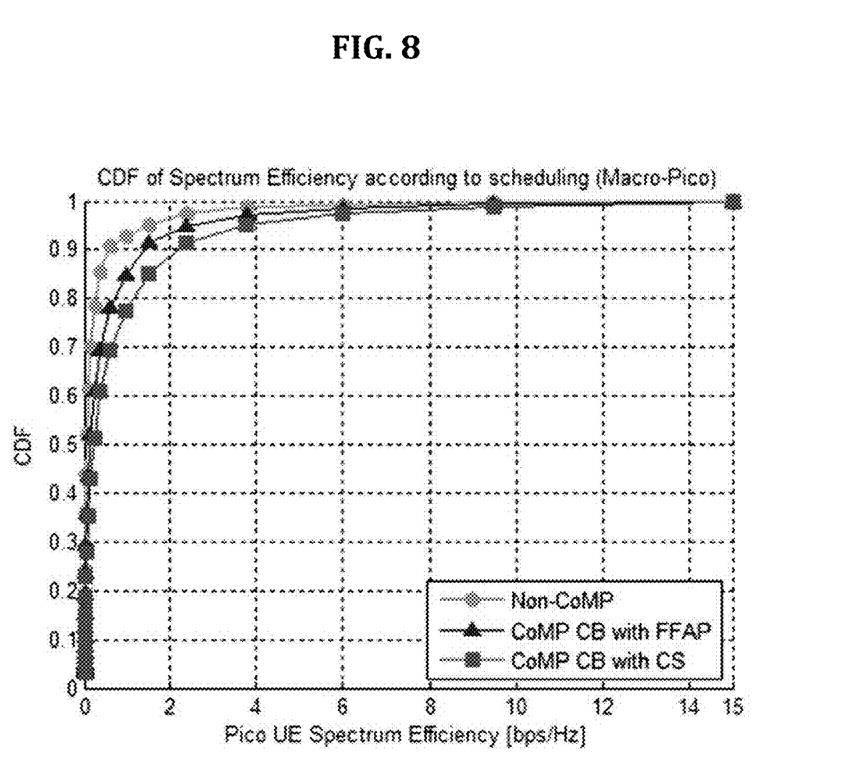

Meanwhile, graphs of CDFs with respect to spectrum efficiency when scheduling is applied to a CoMP CB technique under the above-described conditions are shown in FIGS. 7 and 8.

FIG. 7 shows spectrum efficiency for a UE in a macrocell when cooperation is performed between macrocells and FIG. 8 shows spectrum efficiency for a UE in a picocell when cooperation is performed between a macrocell and a picocell.

It can be seen from the two results that CDF graphic performance may be further enhanced when the scheduling is applied to the CoMP scheme, compared to when the CoMP scheme is not used, and the performance of the system is most enhanced when CoMP CB and CS techniques are used. It can be also seen that the spectrum efficiency performance of the UE located in the picocell is more enhanced than the spectrum efficiency performance of the UE located in the macrocell.

Figure 9:
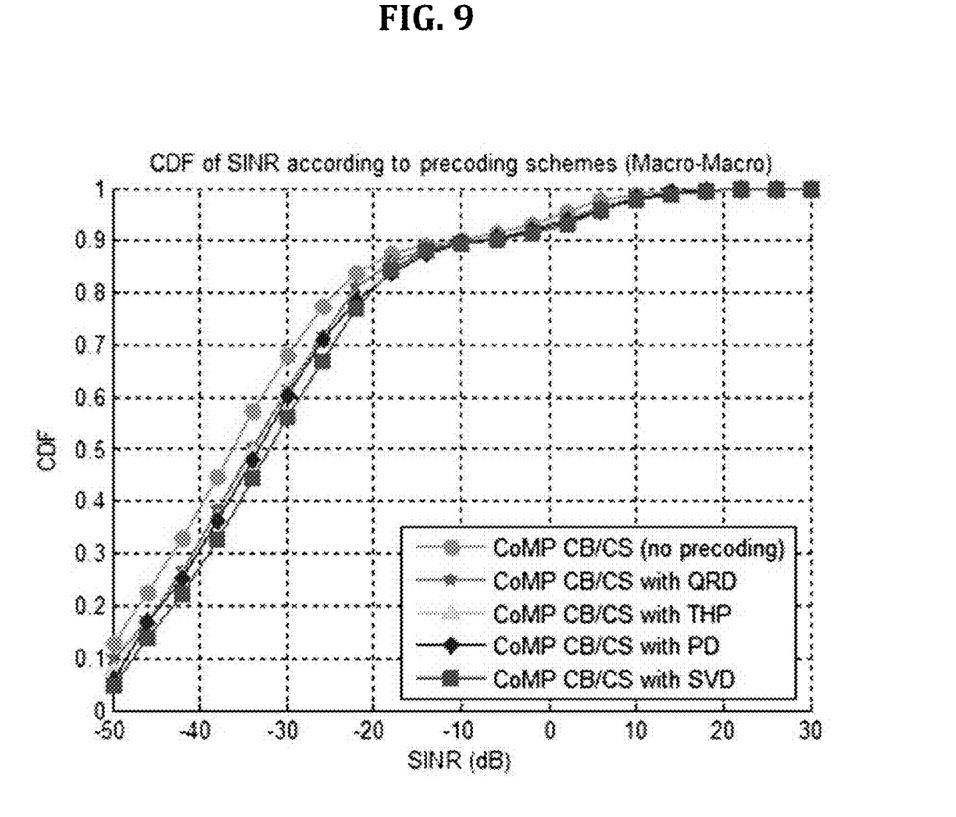
FIGS. 9 and 10 are exemplary views showing graphs of CDFs with respect to an SINR when precoding is applied to CoMP CB and CS techniques according to an embodiment of the present invention.
Figure 10:
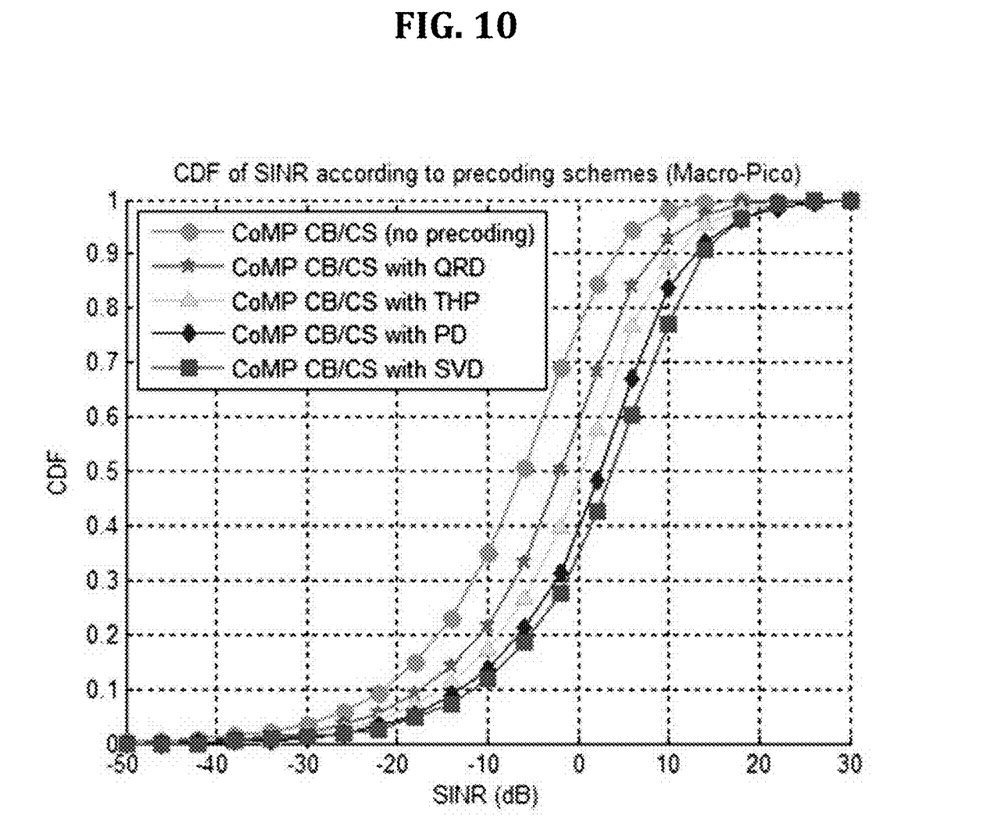

Next, graphs of CDFs with respect to an SINR when precoding is applied to CoMP CB and CS techniques under the above-described conditions are shown in FIGS. 9 and 10.

FIG. 9 shows spectrum efficiency for a UE in a macrocell when cooperation is performed between macrocells, and FIG. 10 shows spectrum efficiency for a UE in a picocell when cooperation is performed between a macrocell and a picocell.

It can be seen from the two results that the performance gain is performed when the CoMP technique and the precoding are applied together. In addition, when the precoding is applied, the performance is enhanced in the order of QRD, THP, PD, and SVD. Moreover, the performance may be further enhanced for a UE in a picocell.

Figure 11:
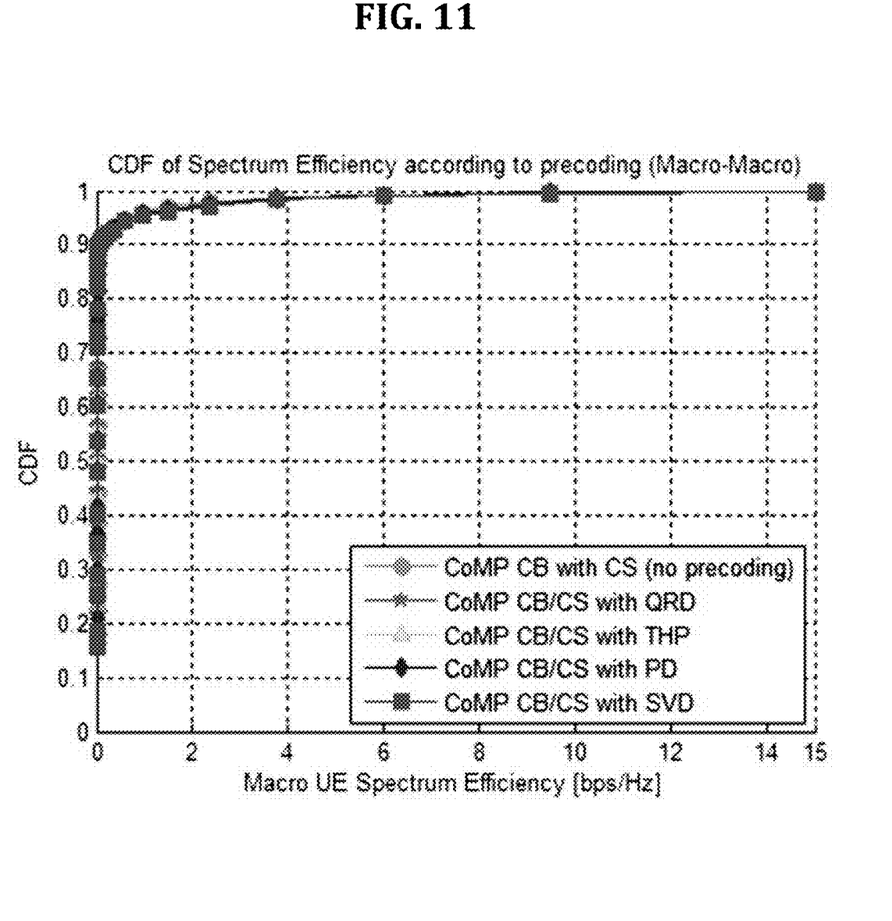
FIGS. 11 and 12 are exemplary views showing graphs of CDFs with respect to spectrum efficiency when precoding is applied to CoMP CB and CS techniques according to an embodiment of the present invention.
Figure 12:
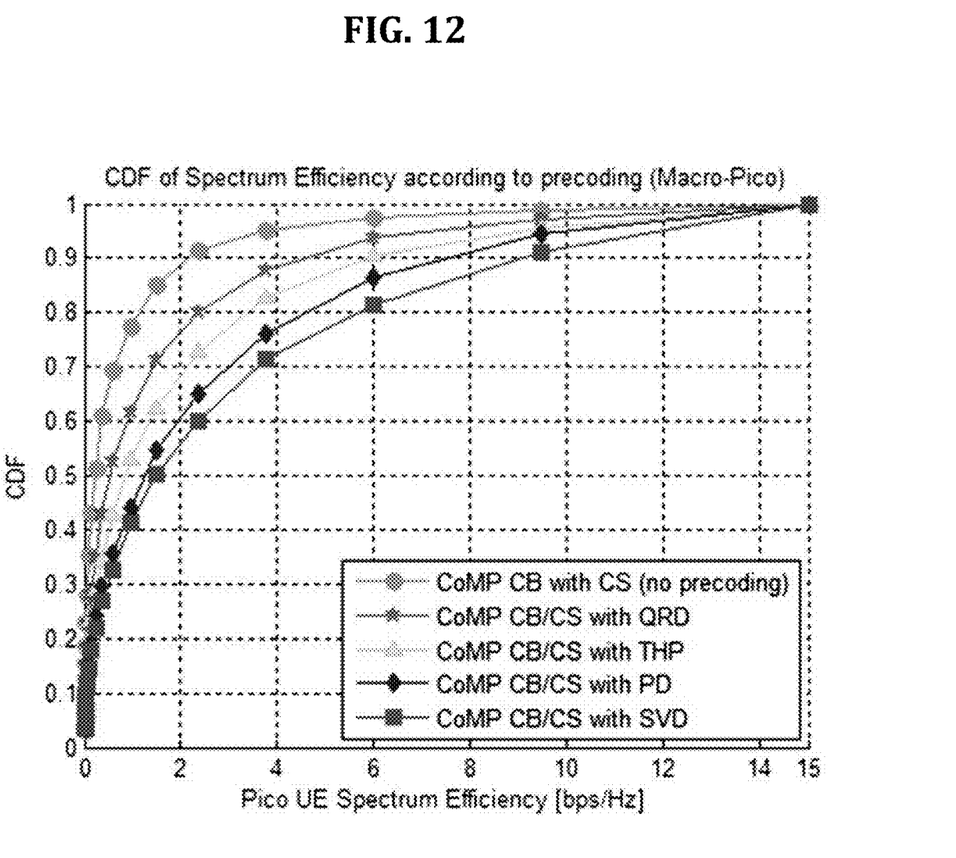

Meanwhile, graphs of CDFs with respect to spectrum efficiency when precoding is applied to CoMP CB and CS techniques under the above-described conditions are shown in FIGS. 11 and 12.

FIG. 11 shows spectrum efficiency for a UE in a macrocell when cooperation is performed between macrocells, and FIG. 12 shows spectrum efficiency for a UE in a picocell when cooperation is performed between a macrocell and a picocell.

It can be seen from the two results that the performance gain is performed when the CoMP technique and the precoding are applied together. It can be also seen that the spectrum efficiency performance of the UE located in the picocell is more enhanced than the spectrum efficiency performance of the UE located in the macrocell. Furthermore, when the precoding is applied, the performance is enhanced in the order of QRD, THP, PD, and SVD.

According to the present invention, it is possible to enhance performance by applying a variety of scheduling and precoding technologies to ICI control in a HetNet on the basis of CoMP technology, and analyzing their performances, compared to a case in which the CoMP technique is not utilized.

It is also possible to compare and analyze performances obtained by applying a CoMP technique between a case in which there is only a macrocell and a case in which there is a picocell at the boundary of the macrocell and thus confirm that the interference may be mitigated and the performance may be enhanced when CoMP technology is applied, compared to a case in which the conventional non-CoMP transmission scheme is utilized. Particularly, it is possible to confirm that the performance may be further enhanced by applying a variety of scheduling and precoding technologies to CoMP and the CoMP technology may be applied even to a next generation mobile communication environment having multiple small cells.

In addition, it is possible to secure cell boundary performances of B4G and 5G mobile communication systems and strengthen the mobility using an advanced cellular technology obtained by applying the scheduling and precoding technologies based on CoMP communication to B4G and 5G systems.

Also, the method for analyzing performance according to ICI control based on CoMP communication in a HetNet according to the present invention may be implemented with software that is readable through a variety of computer means, and recorded in a computer readable recording medium. Here, the recording medium may include a program instruction, a data file, a data structure, or a combination thereof. The program instructions recorded on the computer readable medium may be designed and configured specifically for the present invention or can be publicly known and available to those who are skilled in the field of software. Examples of the recording medium include a magnetic medium such as a hard disk, a floppy disk, and a magnetic tape, an optical medium such as a compact disc read only memory (CD-ROM) and a digital video disc (DVD), a magneto-optical medium such as a floptical disc, and a hardware device specially configured to store and perform the program instruction, such as a read only memory (ROM), a random access memory (RAM), a flash memory, etc. Examples of the program instruction include a high-level language code executable by a computer with an interpreter, in addition to a machine language code made by a compiler. The above exemplary hardware device can be configured to operate as one or more software modules in order to perform the operations of the present invention, and vice versa.

Although specific embodiments have been illustrated and described herein, it is obvious to those skilled in the art that many modifications of the present invention may be made without departing from what is intended to be limited solely by the appended claims. While preferred embodiments of the present invention have been described using specific terms, such description is for illustrative purposes only, and it is to be understood that changes and variations may be made without departing from the spirit or scope of the following claims.

A computer program (also known as a program, software, software application, script, or code) which is equipped in the device according to the present invention to execute the method according to the present invention can be written in any form of programming language, including compiled or interpreted languages, declarative or procedural languages, and can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

INDUSTRIAL APPLICABILITY

A next generation mobile communication core technology obtained by the present invention is expected to significantly contribute to export of terminal components and establishment of a network, in addition to enhancement of mobile communication performance. Specifically, it is expected to contribute to competitiveness for standardization and preoccupation for the next mobile communication market and reduction in technical fees and substitution of import due to securement of the next generation mobile communication core technology in addition to technical independence and price competitiveness due to transition of intellectual property, such as patents, associated with next generation mobile communication to industries and cost reduction of mobile communication business due to international cross-licensing of patents.

What is claimed is:

1. An apparatus for analyzing performance according to inter-cell interference control based on coordinated multi-point (CoMP) communication in a heterogeneous network (HetNet), the apparatus comprising:
a communication unit configured to communicate with a user equipment (UE) and another device within the HetNet; and
a control unit configured to
calculate a priority of a cell center user (CCU) having a highest priority for each of three sectors of one cluster,
compare the calculated priority of the CCU with a priority of a cell edge user (CEU) having a highest priority in the cluster, and
control scheduling such that transmission to the CEU is performed using a CoMP transmission scheme when the priority of the CEU is higher than the priority of the CCU and transmission to the CEU is performed using a general transmission scheme, and when the priority of the CCU is higher than the priority of the CEU,
wherein the control unit is further configured to compare and analyze performances caused by performing the scheduling when there are only macrocells and when there are picocells at the boundaries of the macrocells.

2. The apparatus of claim 1, wherein the control unit performs the calculation, comparison, and scheduling operations on all clusters and all UEs of the clusters in the HetNet.

3. An apparatus for analyzing performance according to inter-cell interference control based on coordinated multi-point (CoMP) communication in a heterogeneous network (HetNet), the apparatus comprising:
a communication unit configured to communicate with a user equipment and another device within the HetNet; and
a control unit configured to perform precoding by multiplying a matrix predetermined according to one of QR decomposition (QRD), Tomlinson-Harashima precoding (THP), polar decomposition (PD) and singular value decomposition (SVD) techniques by a signal intended to be transmitted at an enhanced Node-B transmission end of the HetNet,
wherein the control unit is further configured to compare and analyze performances caused by performing the precoding when there are only macrocells and when there are picocells at the boundaries of the macrocells, and
wherein the SVD technique is a technique for multiplying channels by an orthogonal matrix to separate the channels in parallel at the communication unit, and channel matrix H and precoding matrix W are expressed as Formulae (10) below, $$H = U\Sigma V^H$$

$$W = V \qquad (10),$$

where U is an m-unitary or semi-unitary matrix, $\Sigma$ is an m-rectangular diagonal matrix having a positive diagonal component, and V is an n-unitary matrix.

4. The apparatus of claim 3, wherein the QRD technique decomposes a channel matrix through QR decomposition and thus generates a precoding matrix, and the channel matrix H and the precoding matrix W are expressed as Formulae (8) below, $$H = RQ^H$$

$$W = QF \qquad (8),$$

where Q is a unitary or semi-unitary matrix and R is a lower triangular matrix.

5. The apparatus of claim 3, wherein the THP technique is a non-linear precoding technique and a technique additionally using a modulo operation, the modulo operation being symmetrical to a point above a threshold value and performed using Formula (9), $$\mathrm{mod}_A(x) = x - A\left\lfloor \left(x - \frac{A}{2}\right)\Big/A \right\rfloor. \qquad (9)$$

6. The apparatus of claim 4, wherein the PD technique separates channels based on the SVD technique, and a channel matrix H and a precoding matrix W are expressed as Formulae (11) below, $$H=QSP^H=AU^H$$

$$A=QSQ^H$$

$$W=U=PQ^H \quad (11),$$

where A is a positive semi-definite Hermitian gain matrix, and U is a unitary or semi-unitary phase matrix.

7. A method of analyzing performance according to inter-cell interference control based on coordinated multipoint (CoMP) communication in a heterogeneous network (HetNet), the method comprising:
  calculating a priority of a cell center user (CCU) having a highest priority for each of three sectors of one cluster in a HetNet of a Long Term Evolution-Advanced (LTE-A) system;
  comparing the calculated priority of the CCU with a priority of a cell edge user (CEU) having a highest priority in the cluster;
  determining which of the priority of the CCU and the priority of the CEU is higher;
  performing scheduling such that transmission to the CEU is performed using the CoMP transmission scheme when the priority of the CEU is higher than the priority of the CCU and transmission to the CEU is performed using a general transmission scheme when the priority of the CCU is higher than the priority of the CEU; and
  comparing and analyzing performances caused by performing the scheduling when there are only macrocells and when there are picocells at the boundaries of the macrocells.

8. The method of claim 7, wherein the calculation, comparison, determination, and scheduling are performed on all clusters and all user terminals in the clusters in the LTE-A network.

9. A method of analyzing performance according to inter-cell interference control based on coordinated multipoint (CoMP) communication in a heterogeneous network (HetNet), the method comprising:
  performing precoding by multiplying a matrix predetermined according to one of QR decomposition (QRD), Tomlinson-Harashima precoding (THP), polar decomposition (PD) and singular value decomposition (SVD) techniques by a signal intended to be transmitted at an enhanced Node-B transmission end of the HetNet, and
  comparing and analyzing performances caused by performing the precoding when there are only macrocells or when there are picocells at the boundaries of the macrocells,
  wherein the SVD technique is a technique for multiplying channels by an orthogonal matrix to separate the channels in parallel at a communication unit, and a channel matrix H and a precoding matrix W are expressed as Formulae (10) below, $$H=U\Sigma V^H$$

$$W=V \quad (10),$$

where U is an m-unitary or semi-unitary matrix, Σ is an m-rectangular diagonal matrix having a positive diagonal component, and V is an n-unitary matrix.

10. The method of claim 9, wherein the QRD technique decomposes a channel matrix through QR decomposition and thus generates a precoding matrix, and the channel matrix H and the precoding matrix W are expressed as Formulae (8) below, $$H=RQ^H$$

$$W=QF \quad (8),$$

where Q is a unitary or semi-unitary matrix and R is a lower triangular matrix.

11. The method of claim 10, wherein the THP technique is a non-linear precoding technique and additionally performs a modulo operation, the modulo operation being symmetrical to a point above a threshold value and performed using Formula (9), $$\mathrm{mod}_A(x) = x - A\left\lfloor \left(x - \frac{A}{2}\right)\Big/A \right\rfloor. \quad (9)$$

12. The method of claim 10, wherein the PD technique separates channels based on the SVD technique, and a channel matrix H and a precoding matrix W are expressed as Formulae (11) below, $$H=QSP^H=AU^H$$

$$A=QSQ^H$$

$$W=U=PQ^H \quad (11),$$

where A is a positive semi-definite Hermitian gain matrix, and U is a unitary or semi-unitary phase matrix.

13. A non-transitory computer-readable recording medium storing a computer program for executing the method of analyzing performance according to inter-cell interference control based on coordinated multipoint (CoMP) communication in a heterogeneous network of claim 7.

* * * * *